Feb. 12, 1946.   R. G. DYKEMAN   2,394,672
VALVE MECHANISM
Filed Jan. 25, 1943
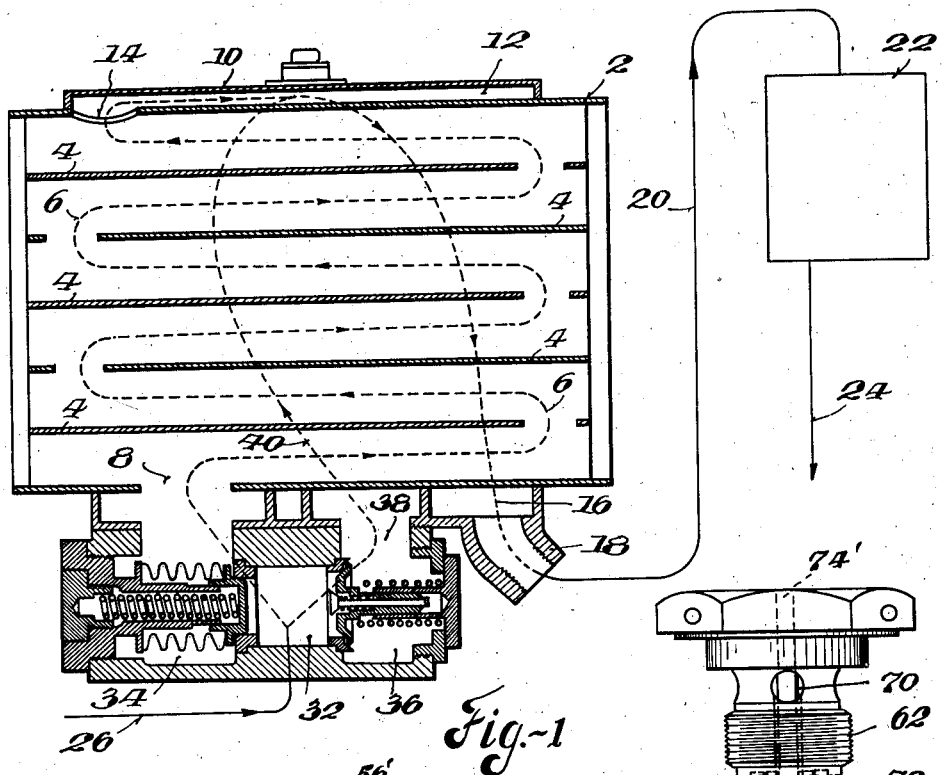
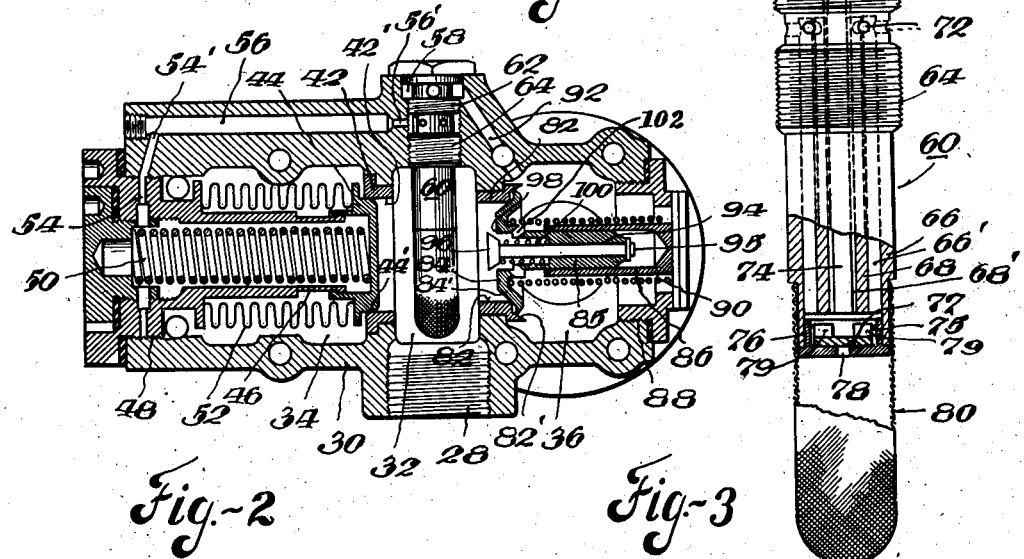
INVENTOR
Reuben G. Dykeman
BY C. B. Stevens
ATTORNEY Patented Feb. 12, 1946

2,394,672

UNITED STATES PATENT OFFICE 2,394,672

VALVE MECHANISM

Reuben G. Dykeman, Dayton, Ohio, assignor to United Aircraft Products, Inc., Dayton, Ohio, a corporation of Ohio Application January 25, 1943, Serial No. 473,542

1 Claim. (Cl. 277—45)

This invention relates to a relief valve for a viscosity controlled system of the type disclosed in the prior application, S. N. 223,678, filed August 8, 1938, by the present applicant and Henry B. Clark for Viscosity controlled unit. More particularly, the invention concerns means for utilizing the motive force of the fluid being controlled for driving the moving parts thereof, and for utilizing the variations in viscosity of such fluid for controlling the movements of the parts.

The present invention is herein illustrated and described as applied to lubricating systems of the type used for airplane and the like motors, for quickly bringing chilled, congealed or semi-fluid oil to proper lubricating consistency wherein alternate flow paths are utilized for the oil in accordance with the current consistency of the oil. In this system, separate valves control the flow of oil to the separate paths, the valves being simultaneously subjected to the pressure of the incoming fluid and being so responsive to the viscous character of the fluid as to govern the further course of the fluid to one path or the other. It is an object of this invention to provide a valve mechanism movable between a number of positions, yet having a substantially constant response throughout its various movements.

During the operation of an engine having a system of the type now contemplated, including an oil conditioning device, or heat exchanger, an oil pump for forcing the oil through the conditioner, and a reservoir in the return line from the conditioner to the engine, it has been found that air becomes trapped in the oil circuit, particularly during idling of the engine when oil pressure is low. When the speed of the engine is increased, the trapped air which is then pumped through the line creates false pressure or an air pocket. While the trapped air has heretofore been eliminated after it reaches the reservoir by venting, deleterious effects on the control valves, which lie between the pump and the reservoir have been experienced, since the valves rely for their operation and control, upon the viscosity of the fluid being administered. It is therefore an object of this invention to provide a valve mechanism having not only a constant response to the oil which it controls, but which will not be deleteriously affected when subjected to false high or low pressure resulting from air bubbles or pockets in the oil.

Yet another object of the invention is to provide a valve mechanism which will relieve the fluid of entrapped air bubbles or pockets by automatically passing such air towards its point of escape, such as a vented reservoir, via the shortest or least damaging path.

These and other objectives, such as the provision of a valve mechanism easy and inexpensive to manufacture, simple to assemble, capable of precision adjustment and rugged and durable in operation, will be apparent from the following specification and drawing, in which:

Fig. 1 is a vertical sectional view of a viscosity controlled unit embodying the present invention and applied to a heat exchange unit;

Fig. 2 is an enlarged horizontal sectional view of the viscosity controlled unit embodying the present invention; and Fig. 3 is a detailed section view of a friction tube comprising a modification of the tube structure disclosed in the above-mentioned prior application S. N. 223,678.

Referring now to the drawing, the invention is shown applied to a conditioner for congealable liquids comprising a shell 2 forming a cylindrical main chamber of the type usually having air tubes (not shown) extending therethrough from end to end, and having a plurality of fixed horizontal baffles 4 defining an elongated tortuous, zigzag passage as indicated by dash line 6, which shows the normal course of liquid, such as oil, through the main chamber after entering an inlet 8.

Surrounding shell 2 and spaced therefrom, a cylindrical jacket 10 encloses an annular warming chamber 12 into which the oil normally flowing along course 6 through the main chamber enters through outlet 14, thereafter to pass along course 16 around the warming chamber and out through outlet fitting 18.

While other and auxiliary reservoirs and outlets may be utilized, it suffices for present illustrative purposes to state that after leaving the warming chamber through outlet fitting 18, the liquid, hereinafter referred to in the description as oil, is passed through a conduit, indicated by arrow line 20, to a vented reservoir 22, and thence through return line 24 to a motor or the like utilization device (not shown). Upon leaving the motor, the oil is generally pumped through a supply line, as shown at 26, back to the conditioner, where it first enters the valve mechanism which forms the essence of this invention, through inlet 28.

The valve mechanism includes a hollow casing 30 rigidly affixed to the outside of warming jacket 10, in the interior of which casing is a central chamber 32, communicating with inlet 28 and through left and right ventricals 34 and 36, respectively, to inlet 8 of the main chamber and to an inlet 38 of warming chamber 12. The valve mechanism described below controls the flow of oil so that when the oil within the main chamber is cold and congealed, hot oil from the motor is pumped through inlet 28, central chamber 32, right ventrical 36, inlet 38 around through the warming chamber 12 as indicated by dotted lines 40 and 16, outlet 18, conduit 20, reservoir 22 and through line 24 back to the motor. When the oil passing around the warming chamber has heated the oil within the main chamber so as to make flow therethrough feasible, the valve mechanism closes the passage to right ventrical 38, and opens up the passage to the left ventrical 34 so that then the flow circuit is through tortuous passage 6, where cooling occurs, before entering chamber 12 and passing out as described above.

The valve mechanism for selectively distributing the oil along course 6—16 through the tortuous cooling passage, and out through warming chamber 12 when the oil is cold and congealed, or only semi-fluid, comprises an annular valve seat 42 and a valve 44, the engaging surfaces 42', 44', of the seat and valve being relatively long so as to require appreciable movement of valve 44 under unbalanced pressure conditions before flow therepast is initiated. The rear end of valve 44 is slidably engaged around a tubular slide guide 46, the rear end of the slide guide being threaded in casing 30, as indicated at 48, and a coil spring 50 is engaged under compression between the rear face of valve 44 and the rear end of slide guide 46 normally to bias valve 44 into closed position.

Valve 44 is also urged towards closed position by an expansible bellows 52, the ends of which are affixed to the valve and slide guide so as to form a closed chamber except for a duct 54 bored in the rear end of the slide guide and communicating through a duct 54' with a passage 56 in casing 30. The end 56' of passage 58 leads into a bore 58 in casing 30 and eventually, through a venturi or friction tube 60, back into central chamber 32 so that, under certain conditions described below, oil under pressure within central chamber 32 exerts pressure through friction tube 60, bore 58, ducts 56, 54, and into the interior of expansible bellows 52 whereby to cooperate with spring 50 to hold valve 44 closed. Ordinarily, there is flow of oil through the friction tube and ducts into and from bellows 52, the action being mainly that of pressure differentials, and it should be noted that spring 50 is so loaded that, when oil under comparatively great pressure is passed by the friction tube into the bellows, the pressure of the oil within central chamber 32 is overcome and valve 44 is driven closed, but when comparatively little pressure prevails within bellows 52, the pressure within central chamber 32 exerted against the front face of valve 44 overcomes the closing bias of the spring 50 and bellows 52, and the valve is thus driven open.

Friction tube 60, which is engaged by spaced sets of threads 62, 64 in bore 58 in the casing, includes a plurality of circumferentially spaced conduits or ducts 66' and a central bore or channel 68' so spaced from each other as to form outer and inner concentric fluid channels which are open at their lower ends. It will be seen from Fig. 3 that the central bore or channel 68' extends into the head of the friction tube and exits therefrom through radial holes 70, and that the outer conduits or ducts 66' exit through radial holes 72 between threads 60 and 64, so that oil under pressure entering the lower ends of ducts 66' flows into passage 56 and to bellows 52 as outlined above.

Central bore or channel 68' is almost closed by a concentric rod 74, the upper end 74' of which is mounted in the head of friction tube 60 and the main portion of which extends through the inner passage with only a narrow, annular space therebetween so that flow of thick, cold, congealed oil through the inner passage is virtually prevented. In the lower end of friction tube 60, a cylindrical cage 76 is engaged, the cage having a restricted opening 78 in the bottom wall thereof. A check valve 75 having a disc-like lower portion 77 and a plurality of upstanding, spaced segments 79 is loosely fitted in cage 76 for preventing downward flow of oil through restricted opening 78 by engagement of the disc-like lower portion 77 with the bottom wall of the cylindrical cage 76, but allowing oil under pressure to flow between the side wall of the cage and the segments 79 of the check valve to the lower ends of channels 66', when the pressure of the oil entering opening 78 is sufficient to raise the check valve from its position shown in Fig. 3. When check valve 75 is raised, the disc-like lower portion 77 thereof lies above the bottom wall of cylindrical cage 76 so that oil may flow into circumferentially spaced conduits 66' and inner channel 68' from between spaced segments 79. In order to prevent clogging of restricted opening 78 and the narrow passages, a filter screen 80 is affixed to the lower end of friction tube 60. Check valve 75, when the engine and oil pump are not functioning is in its lowermost position and acts to prevent oil from draining backward from the reservoir or tank 22, through holes 70, inner channel 68' and thence through opening 78 into the chamber 32.

Valve 84, which has its front face beveled rearwardly and then flanged outwardly as indicated at 84', engages a valve seat 82, the rear working face of which is flared outwardly as shown at 82' so that when closed, the front of the valve presents relatively little area to the oil under pressure within central chamber 32.

Valve 84 is also provided with a hollow stem 85 sliding in a slide guide 86, the rear end of the slide guide being affixed in casing 30 as shown at 86, and an expansion spring 90 is engaged under compression between the slide guide and the valve normally to bias the valve towards closed position against its seat. Since the resistance of the spring increases as it is further compressed by opening movement of valve 84, increased driving force for the valve is obtained by so forming the engaging faces 82', 84' of the seat and valve that, as the valve begins to open, the beveled and outwardly flanged portions thereof are unmasked, thus to expose a larger effective area to the oil flowing from central chamber 32. Thus, ratio of the effective resistance of the valve spring to the effective opening force remains substantially constant throughout the entire range of movement.

The formation of the engaging faces of the valve seat and the valve also allows only a gradual flow of oil through the throat therebetween as the valve first begins to open, the throat progressively increasing in size at a rate much greater than the rate of opening movement as the valve is forced open. Through this arrangement, a smooth and gradual operation of valve 84 is attained.

As in the case of valve 44, the valve 84 is also augmented or urged towards closed position by the pressure of oil through a passage, 92, but in this instance, passage 92 connects holes 70 leading from inner passage 68' so that when back pressure is created in right ventrical 36 as described above the force of spring 90 is sufficient to maintain valve 84 closed.

In order to pass air bubbles or pockets of air through the cooling jacket only and out to the vented reservoir as directly as possible, the hollow stem 85 of valve 84 is provided with a bore 94 slidably supporting the stem 95 of a small valve 96 which engages a seat 98 formed by an opening in the face of valve 84. Small valve 96 is normally biased forwardly towards open position by a spring 100 engaged under compression between the plug 94 and valve 96 so as to open a set of bleeder conduits 102 extending through valve 84 between central chamber 32 and right ventrical 36. The bias of spring 100 is such that when oil is pumped into chamber 32, the tractive force of the oil is sufficient to overcome spring 100 so that the valve 96 will remain closed. However, when air enters chamber 32, its tractive force will be insufficient to overcome spring 100 so that the valve will then open to allow the air to pass directly through the warming jacket to the vented reservoir.

In operation, assuming that the oil is cold and only semi-fluid, both valves 44 and 84 will be held closed by their respective springs and valve 96 will be open until the oil under pressure enters chamber 32 through inlet 28. Then valve 96 closes by the tractive force of the oil impinging thereagainst, and opening force is exerted by the oil against both valves 44 and 84. Valve 44 will remain closed because of the back pressure of oil entering friction tube 60 and passing through the large passage 66' eventually to expand bellows 52. Meanwhile, valve 84 will open because the resistance of spring 90 is alone insufficient to withstand the force of the oil in chamber 32 in the absence of back pressure in the right ventrical 36. At this time, if any small air bubbles are pumped in with the oil, they will escape through the throat between seat 82 and valve 84. If great pockets of air enter chamber 32, the tractive force of the air then is insufficient to hold valve 84 open, but when valve 84 closes, valve 96 opens to bleed the air out.

As the oil becomes heated and less viscous, it will flow out of bellows 52 as the valve 44 is opened under the force of the pressure in chamber 32 and back through restricted passage 68' so as to equalize the pressures prevailing in right ventrical 36 and central chamber 32, thereby allowing spring 90 to drive valve 84 closed.

The foregoing specification which describes the apparatus and method of directing a congealable fluid selectively along any one of a plurality of paths in accordance with the viscosity of the oil, of utilizing the tractive force of the oil itself for operating the distributing mechanism, and of separating fluids, such as oil and air, in accordance with their tractive forces, is illustrative only, since the teachings herein are applicable to other structures and fluid where similar problems are encountered and where similar results are desired.

I claim:

A valve of the character described including, a tubular body providing a fluid passage therethrough, said body having its outlet end formed to provide a flat shoulder extending at right angles to the wall defining said fluid passage so as to provide a circular valve seat having a sharp seating edge, said shoulder further having a flared part extending outwardly therefrom in the direction of fluid flowing through said body so as to provide a second valve seat having an inclined valve receiving surface disposed in encircling spaced relation to the first-named valve seat, a ported valve member of substantially frustoconical form providing an intermediate inclined portion for engaging the first-named valve seat and a thin substantially radially outwardly extending tapered free end portion providing a feather edge for engaging the second-named valve seat, means for normally biasing said ported valve member toward and into engagement with said seats, a second frusto-conical valve received in the ported area of the first-named valve member for controlling the flow of fluid through the latter, and means for normally biasing said second valve toward open position against the direction of fluid flowing through the tubular body.

REUBEN G. DYKEMAN.